United States Patent [19]

Carré

[11] 4,118,077
[45] Oct. 3, 1978

[54] BRAKING CORRECTION DEVICE

[75] Inventor: Jean-Jacques Carré, Montreuil, France

[73] Assignee: Societe Anonyme D.B.A., Paris, France

[21] Appl. No.: 824,018

[22] Filed: Aug. 12, 1977

Related U.S. Application Data

[63] Continuation-in-part of Ser. No. 766,322, Feb. 7, 1977, Pat. No. 4,059,174.

[51] Int. Cl.$^2$ .............................................. B60T 8/18
[52] U.S. Cl. .................................. 303/6 C; 303/22 R
[58] Field of Search ............... 188/195, 349; 303/6 C, 303/22 A, 22 R

[56] References Cited

U.S. PATENT DOCUMENTS

| | | | |
|---|---|---|---|
| 3,597,009 | 8/1971 | Baldwin | 303/6 C |
| 4,053,185 | 10/1977 | Carre | 303/6 C |
| 4,062,597 | 12/1977 | Sawyer et al. | 303/6 C |

Primary Examiner—Duane A. Reger
Attorney, Agent, or Firm—Paul David Schoenle; Ken C. Decker

[57] ABSTRACT

A braking correction device of the type having a housing in which is defined a bore with a stepped piston slidably mounted therein so as to divide the bore into an inlet and an outlet chambers respectively communicating with the master cylinder and the brake actuators. The stepped piston has a head with a peripheral groove in which an annular ring is mounted with axial and radial clearance. The ring cooperates with the bore surface to control communication between the inlet and outlet chambers as a function of the position of the stepped piston. The bore surface has a first part forming a fluid tight side wall and a second part forming a side wall of porous material. The second part is adjacent the outlet chamber. A radial clearance is provided between the piston head and the bore surface of porous material for by-passing the sleeve of porous material to ensure the unihibited hydraulic flow between the inlet and outlet chamber is obtained during the non proportioning phase.

6 Claims, 4 Drawing Figures

BRAKING CORRECTION DEVICE

This is a continuation-in-part of U.S. patent application Ser. No. 766,322, filed on Feb. 7, 1977, now U.S. Pat. No. 4,059,174.

The invention relates to a braking correction device of the hydraulic type for use between a brake pressure source and brake actuator in a motor vehicle.

Braking correction devices conventionally comprise a housing with a bore in which is slidably mounted a movable piston which separates the housing into an inlet chamber and an outlet chamber respectively in communication with a brake pressure source and at least one brake actuator. The piston also comprises a groove in which is received a ring of elastomeric material. In operation, the ring is adapted to move past an orifice or a slot in the housing, said groove communicating with the outlet chamber. In this manner, communication between the inlet and outlet chambers is controlled as a function of the position of the piston, so that substantially uninhibited communication between the inlet and outlet chambers is allowed until the pressure prevailing in the inlet chamber reaches a predetermined value after which the rate of pressure increase in the outlet chamber is reduced upon a further increase of the pressure in the inlet chamber.

This type of device has the following drawback: during proportioning operation the ring of elastomeric material continuously moves past the orifice or slot so that the ring will be worn out rather rapidly, which provokes a risk of leakage between the inlet and outlet chambers.

It is an object of the present invention to design a braking correction device wherein the risks of wear of the ring of elastomeric material, are reduced to a minimum.

It is a further object of the present invention to propose a braking correction device wherein unhinibited fluid communication between the inlet and outlet chambers occurs during non-proportioning phase.

These and further objects of the invention will be explained with reference to the ensuring description wherein.

Figure 1:
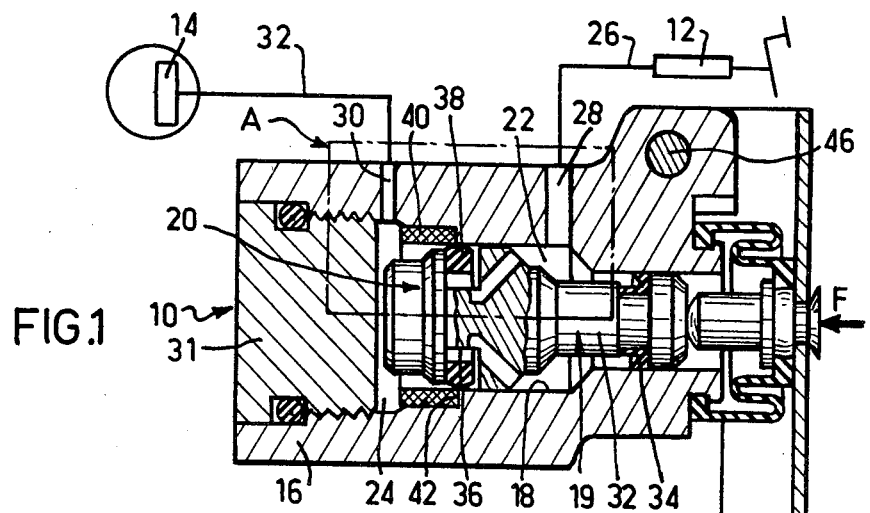
FIG. 1 is a longitudinal section of a hydraulic brake correction device according to the teachings of the invention.

Referring now to the drawings, there is shown a correction device generally designated by reference 10, which is mounted between a hydraulic brake pressure source of any known type such as a master-cylinder 12, and a brake actuator 14. The correction device has a housing 16 in which is defined a bore 18. A stepped piston 19 is slidably mounted in bore 18. The stepped piston has a head 20 which divides the bore into an inlet chamber 22, and an outlet chamber 24. Inlet chamber 22 adjoins that face of the stepped piston 19 having the smaller effective cross section whereas outlet chamber 24 adjoins that face of the stepped piston having the larger effectice cross section. Chamber 22 communicates with master cylinder 12 by way of a line 26 and an inlet passage 28 in the housing. Chamber 24 communicates with the brake actuator 14 by way of an outlet port 30 and a line 32.

As mentioned above, the piston 19 is of the stepped type. Its end 32 remote from its head 20 projects in a reduced diameter portion of the housing through a seal 34. The piston head 20 has on its periphery a groove 36 which receives a ring 38 of elastomeric material, with radial and axial clearance, as shown in the Figure. The ring 38 acts as a valve closure member as will be explained in greater details below. During operation, ring 38 cooperates with the inner wall of the bore so as to axially move in front of a portion of said bore inner surface, said portion being formed of a first part defined by the housing bore itself or integral with the latter, and said second part being made of a sleeve 40 of porous material affixed to the housing in abutment against a shoulder 42. The sleeve 40 is located adjacent the outlet chamber 24 and its inner face has a diameter equal to that of the bore 18. As a consequence, ring 38 is adapted to move in front of a continuously smooth surface and the risks of wear are reduced to a minimum. To allow fluid to flow freely from the chamber 22 to the right-hand side of the ring 38 and the bottom of the groove 36, the diameter of the piston head 20 is reduced where it adjoins the inlet chamber 22, and also passages 44 are provided between the bottom of the groove 36 and the reduced diameter portion of the piston head. The sleeve 40 of porous material is by way of example made of porous sintered material. The piston 19 is biased into an idle position by a return force indicated diagrammatically by an arrow F. In this idle position (see FIG. 2) which is fixed relative to the housing, the piston bears on the end of the bore 18, against plug 31. In the embodiment illustrated, the force F is transmitted by a lever 45 pivotable on a pin 46 fixed to the housing 16, the free end of the lever being associated with resilient return means (not shown), capable of generating the force F. Without exceeding the scope of the invention, the tension of the resilient return means may be varied as a function of the load on at least one axle of the vehicle, by means of any construction known to those skilled in the art. It should also be noted that the braking correction device shown on FIG. 1 is not illustrated in its idle position, but in the limit position in which the two chambers 22, 24 have just been disconnected.

Considering more particularly the sliding arrangement between sleeve 40 and the head 20 of the piston, the portion of the piston head which is situated at the left of groove 36 (when considering the Figures), that is the portion which is immediately adjacent outlet chamber 24, has a diameter slightly smaller than the inner diameter sleeve 40 and bore 18, so as to define a clearance 50 therebetween. The advantages of this particular feature will become apparent from the explanations of the operating made of the braking correction device.

Figure 2:
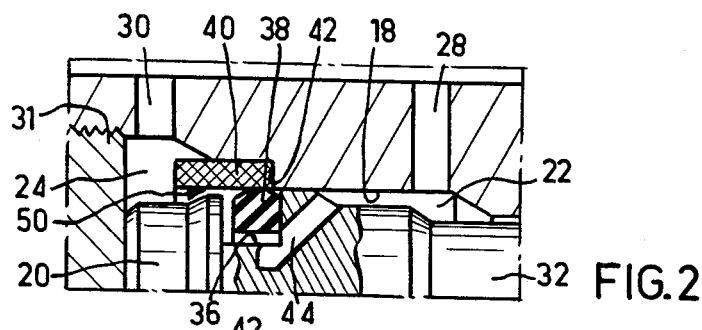
FIG. 2 is an enlarged view of the portion designated by A in FIG. 1, when the piston is in its idle position.
Figure 3:
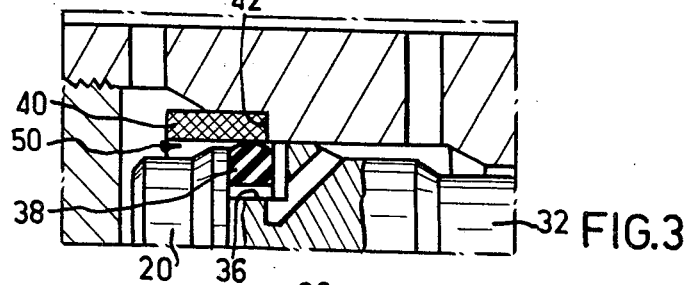
FIG. 3 is an enlarged view of the portion designated by A in FIG. 1, when the piston is in a position substantially corresponding to the end of the non-proportioning phase.
Figure 4:
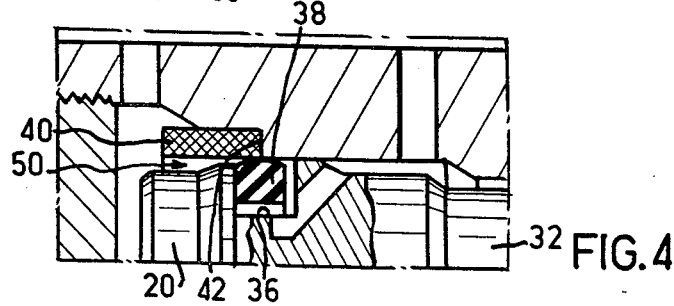
FIG. 4 is an enlarged view of the portion designated by A in FIG. 1, when the piston is in a position corresponding to the proportioning phase.

The braking correction device just described operates as follows and the different operating phases will be explained in relation with FIGS. 2 to 4 of the drawings which are enlarged views of the position of FIG. 1, shown by letter A.

When the brake circuit is idle, the piston 19 is in the left-hand limit position in the Figures, so that the contact surface between the ring 38 and bore surface is well to the left of the shoulder 42. Therefore, at the beginning of operation of the brake circuit, fluid from the inlet chamber flows through the uncovered part of sleeve 40 to chamber 24. However, hydraulic fluid mainly flows without restriction through the bottom of groove 36 and clearance 50. Consequently, during the non-proportioning phase, there is a direct communication between the inlet and outlet chambers which avoids any delay in the pressure rise in the outlet chamber and brake actuators. This feature is particularly interesting when the braking correction device operates at cold temperatures for which the hydraulic fluid is rather viscous and the communication through the porous material is somewhat delayed.

When the pressure in the chamber 19 reaches a predetermined value depending an the effectice cross section area of the end 32 and on the return force F, the piston 20 is moved towards the right in the Figures, so that the left-hand side of the ring 38 cooperates in a fluid tight manner with that surface of the groove adjoining it, to close fluid communication through clearance 50. On FIG. 3, the piston and ring are represented in the positions which they assume just before the pressure from the master cylinder reaches the predetermined value (transition pressure) corresponding to the knee of the correction device characteristic. In the position illustrated, there is still a slight fluid communication between the inlet and outlet chambers 22 and 24 through sleeve 40. On FIG. 4, the ring 38 conceals the end of the sleeve of porous material and thereby cooperates a little, but in a fluid tight manner, owing to the effect of the pressure on the inside surface of the ring 38. Any increase in pressure in chamber 22, beyond the transition pressure, will cause the piston to oscillate about the position shown at FIG. 4, so as to meter fluid flow through sleeve 40 thereby allowing the pressure in chamber 24 to rise at a reduced rate, compared to the pressure rise in chamber 22. The reduction rate depends on the ratio between the effective cross sections of the piston end faces adjoining the chambers 22, 24. Owing to the good surface condition of articles made from sintered material, and also to the absence of orifices of small cross section and any other rough or abrupt point such as exists in the prior art, the wear on the periphery of the ring 38 is much reduced so that the device lasts substantially longer.

When the brakes of the vehicle are released, the piston 19 moves to the right in the Figure, sliding along the ring 38 until the pressures in the two chambers balance. The ring 38 ceases to cooperate in a fluid tight manner with the left-hand surface of groove 36, and fluid can again flow freely from chamber 24 to chamber 22 through the sleeve 40, the clearance 50 and the passages.

The invention is not limited to the embodiment which has been shown with reference to FIGS. 1 to 4, in which the sleeve 40 has been affixed to the housing in such a way as to be force fitted in the bore. On the contrary, the invention also comprises those brake correction devices of the type described in U.S. patent application Ser. No. 766,322, of which the present invention is a continuation-in-part, and in which the piston head is slidably mounted in an arrangement formed of a sleeve of porous material in abutment against the bore end, and of a ring mounted adjacent to said sleeve. In this case, the fluid is allowed to pass toward the outlet chamber in two manners, when the piston is in its idle position: firstly through the radial clearance in the same manner as described above, and secondly through the sleeve of porous material, an annular space between the sleeve and the housing bore, and at least an aperture through the sleeve.

I claim:

1. Braking correction device having a housing with a bore therein, a stepped piston having a head slidably mounted in the bore of the housing and cooperating with the latter so as to define in said bore an inlet chamber adjoining the piston head face having the smallest effective cross section, and an outlet chamber adjoining the piston head face having the larger effective cross section, said inlet chamber being adapted to be connected to a source of hydraulic fluid pressure and said outlet chamber being adapted to be connected to at least one brake actuator, said piston head having a peripheral groove in which a ring of elastomeric material is mounted with axial and radial clearance, said ring of elastomeric material cooperating with a portion of the inner surface of said bore to as to open communication between the inlet chamber and the outlet chamber when the piston is in an idle position and so as to close communication between the inlet and outlet chambers when the piston is moved from its idle position, said portion of the inner surface of the bore comprising a first part defining a fluid tight side wall, and a second part formed of a sleeve of porous material, said second part being adjacent to the outlet chamber, an annular space being provided between the piston head and the sleeve of porous material so as to permit uninhibited fluid communication between the inlet and outlet chambers when the piston is in its idle position.

2. Braking correction device according to claim 1, wherein the sleeve is made of porous sintered material.

3. Braking correction device according to claim 1, wherein the first part is integral with the housing and the sleeve forming the second part is affixed to the housing.

4. Braking correction device according to claim 3, wherein the sleeve is force fitted into a stepped portion of the housing bore.

5. Braking correction device according to claim 1 wherein the first part is integral with the housing and the sleeve forming the second part is located without axial play between one end face of the first part and the end of the bore closing the outlet chamber.

6. Braking correction device according to claim 1, wherein the first part is a ring mounted in the housing bore, and the sleeve forming the second part is also mounted in the bore and adjacent said ring, said ring and sleeve being resiliently urged toward the end wall of the outlet chamber so that the sleeve is maintained between the ring and the end wall.

* * * * *